(12) United States Patent
Sakamoto et al.

(10) Patent No.: US 8,727,596 B2
(45) Date of Patent: May 20, 2014

(54) LIGHT SOURCE DEVICE AND SURFACE LIGHT SOURCE DEVICE EQUIPPED WITH SAME

(75) Inventors: Takuya Sakamoto, Kumamoto (JP); Kenji Arita, Kumamoto (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/619,419

(22) Filed: Sep. 14, 2012

(65) Prior Publication Data

US 2013/0010455 A1    Jan. 10, 2013

Related U.S. Application Data

(62) Division of application No. 13/422,059, filed on Mar. 16, 2012, now Pat. No. 8,434,925, which is a division of application No. 12/022,669, filed on Jan. 30, 2008, now Pat. No. 8,167,476.

(30) Foreign Application Priority Data

Jan. 31, 2007    (JP) ................................. 2007-021366

(51) Int. Cl.
    *F21V 7/04*    (2006.01)
(52) U.S. Cl.
    USPC ........................... 362/611; 362/613; 362/633
(58) Field of Classification Search
    USPC ................. 362/219, 249.01, 249.02, 311.01, 362/311.02, 606, 608–613, 615, 617, 621, 362/623, 630, 631–634; 349/58, 61, 62, 65
    See application file for complete search history.

(56) References Cited

U.S. PATENT DOCUMENTS

| 5,280,372 A | 1/1994 | Horiuchi |
| 6,208,591 B1 | 3/2001 | Sakurazawa et al. |
| 6,513,944 B2 | 2/2003 | Chou |

(Continued)

FOREIGN PATENT DOCUMENTS

| JP | 6-36118 | 5/1994 |
| JP | 7-199829 | 8/1995 |

(Continued)

OTHER PUBLICATIONS

Japanese Submission of Publication issued on Jan. 11, 2011 in corresponding Japanese Application No. 2007-21366 (with English Translation).

(Continued)

*Primary Examiner* — Hargobind S Sawhney
(74) *Attorney, Agent, or Firm* — Oblon, Spivak, McClelland, Maier & Neustadt, L.L.P.

(57) ABSTRACT

A light source device comprising: a point light source for emitting light; a light source substrate directly mounting the point light source; a light source substrate cover having a through hole or a notch in a position to which the point light source corresponds, the light source substrate cover arranged opposite to a surface of the light source substrate on which the point light source is mounted; and a support member for supporting the light source substrate, the support member arranged to be opposed to the reverse side of the mounting surface of the light source substrate, the support member has a substantially same size with the light source substrate; wherein the light source substrate cover and the support member sandwich the light source substrate to support the light source substrate.

5 Claims, 7 Drawing Sheets

(56) References Cited

U.S. PATENT DOCUMENTS

| | | | |
|---|---|---|---|
| 6,641,284 | B2 | 11/2003 | Stopa et al. |
| 6,847,417 | B2 | 1/2005 | Kim |
| 6,960,001 | B2 | 11/2005 | Nitto et al. |
| 7,008,079 | B2 | 3/2006 | Smith |
| 7,083,318 | B2 * | 8/2006 | Ha et al. ............... 362/633 |
| 7,182,627 | B1 | 2/2007 | Huang |
| 7,270,555 | B2 | 9/2007 | Wu |
| 7,349,163 | B2 | 3/2008 | Angelini et al. |
| 7,359,012 | B2 * | 4/2008 | Ishiwa et al. ............... 349/65 |
| 7,384,179 | B2 | 6/2008 | Sakai |
| 7,390,108 | B1 | 6/2008 | Wang |
| 7,404,655 | B2 | 7/2008 | Walser et al. |
| 7,407,307 | B2 | 8/2008 | Hiratsuka |
| 7,441,938 | B2 | 10/2008 | Sakai et al. |
| 7,465,082 | B2 | 12/2008 | Sakamoto et al. |
| 7,481,566 | B2 | 1/2009 | Han |
| 7,585,099 | B2 | 9/2009 | Kim et al. |
| 7,604,389 | B2 | 10/2009 | Sakai et al. |
| 7,611,274 | B2 | 11/2009 | Hsiao et al. |
| 7,742,121 | B2 * | 6/2010 | Mori et al. ............... 349/58 |
| 7,775,702 | B2 | 8/2010 | Kuroiwa |
| 7,830,468 | B2 * | 11/2010 | Ahn ............... 349/58 |
| 7,864,258 | B2 | 1/2011 | Cho et al. |
| 7,896,536 | B2 | 3/2011 | Arita et al. |
| 7,903,198 | B2 * | 3/2011 | Abe et al. ............... 349/65 |
| 2002/0186526 | A1 * | 12/2002 | Kim ............... 361/681 |
| 2003/0123258 | A1 | 7/2003 | Nitto et al. |
| 2005/0141244 | A1 | 6/2005 | Hamada et al. |
| 2005/0169002 | A1 | 8/2005 | Steen et al. |
| 2005/0195602 | A1 | 9/2005 | Pan |
| 2006/0007705 | A1 | 1/2006 | Yonemura |
| 2006/0039164 | A1 | 2/2006 | Takahashi |
| 2006/0044838 | A1 | 3/2006 | Nitto |
| 2006/0061706 | A1 | 3/2006 | Miyamoto |
| 2006/0268194 | A1 * | 11/2006 | Morimoto et al. ............... 349/65 |
| 2007/0076433 | A1 | 4/2007 | Kinoshita et al. |
| 2007/0165421 | A1 * | 7/2007 | Sakai et al. ............... 362/612 |
| 2007/0195551 | A1 | 8/2007 | Shin |
| 2008/0232134 | A1 | 9/2008 | Weng et al. |
| 2008/0239750 | A1 | 10/2008 | Chang |
| 2008/0239751 | A1 | 10/2008 | Chang |
| 2009/0128732 | A1 | 5/2009 | Hamada |
| 2009/0268124 | A1 | 10/2009 | Kujiraoka et al. |
| 2009/0316064 | A1 | 12/2009 | Kono et al. |
| 2011/0261585 | A1 | 10/2011 | Shibata et al. |

FOREIGN PATENT DOCUMENTS

| | | |
|---|---|---|
| JP | 2002-91330 A | 3/2002 |
| JP | 2002-229022 | 8/2002 |
| JP | 2002-299700 | 10/2002 |
| JP | 2003-197018 A | 7/2003 |
| JP | 2003-279973 A | 10/2003 |
| JP | 2006-53340 A | 2/2006 |
| JP | 2006-156192 A | 6/2006 |
| JP | 2006-210183 | 8/2006 |
| JP | 2007-26916 | 2/2007 |
| WO | WO 03/069220 A1 | 8/2003 |
| WO | WO 2006/129625 A1 | 12/2006 |

OTHER PUBLICATIONS

Office Action issued Apr. 19, 2011 in Japanese Patent Application No. 2007-021366 (with English translation).

Office Action issued on Oct. 4, 2011, in Japan Patent Application No. 2007-021366 (with English translation).

Office Action issued Sep. 11, 2012 in Japanese Patent Application 2011-133400 (with English-language translation).

Office Action issued Feb. 12, 2013, in Japanese Patent Application No. 2012-137756 with English translation.

Office Action issued on Dec. 17, 2013 in Japanese Patent Application No. 2012-137756 (with English language translation).

Office Action issued Jul. 16, 2013, in Japanese Patent Application No. 2012-137756 (with English-language translation).

* cited by examiner

LIGHT SOURCE DEVICE AND SURFACE LIGHT SOURCE DEVICE EQUIPPED WITH SAME

CROSS REFERENCE TO RELATED APPLICATION

The present application is a divisional of, and claims the benefit under 35 U.S.C. §120 from U.S. application Ser. No. 13/422,059, filed on Mar. 16, 2012, which is a divisional of U.S. application Ser. No. 12/022,669, filed Jan. 30, 2008, which claims priority under 35 U.S.C. §119 from Japanese Patent Application No. 2007-021366, filed on Jan. 31, 2007, the entire contents of each of which are incorporated herein by reference.

TECHNICAL FIELD

The present invention relates to a light source device used for illumination of a display device or the like, and a surface light source device equipped with the light source device.

BACKGROUND

A general display device comprises a display panel, a circuit board, a light source device and the like. A light source device that irradiates light from the rear surface thereof is either a side light type (edge light type) including a light source on the side surface of an enclosure or a direct type including a light source on the bottom of an enclosure in a position opposed to a display panel.

Some of the side light type light source devices use a light guide plate in order to guide light from a light source to an opening of an enclosure. A light source device using a light guide plate propagates, inside the light guide plate, light emitted from a linear light source such as a cold-cathode tube or a point light source such as a light emitting diode (hereinafter referred to as an LED) and diffuses the light by way of a diffusion pattern provided in the light guide plate to take out the light in the shape of a plane at the opening of the enclosure.

With a light source device using a point light source such as an LED as a light-emitting element described above, the luminance of a display screen is enhanced by increasing the number of point light sources thus increasing an element density or increasing the current supplied to each point light source. In any way, heat from each point light source caused by light emission brings the periphery of the point light source at high temperature.

There is proposed a light source device including a light source substrate mounting heat-dissipating means, the light source substrate composed of a flexible printed circuit board (hereinafter referred to as an FPC) mounting point light sources and a wiring pattern to feed power to each light source (for example, Patent Reference 1 (Japanese Published Unexamined Patent Application No. 2006-210183) and Patent Reference 2 (Japanese Published Unexamined Patent Application No. 2002-229022)). A surface lighting device 1 disclosed in Patent Reference 1 is arranged so that a heat-transmitting part 10a provided in a recessed part 10 formed on the side wall 8 of a frame 6 made of a metallic material will come into contact with a mounting surface 3d of each of the point light sources 3 thus receiving the light sources 3 in the recessed part 10. An FPC 4 as a light source substrate and the point light sources 3 are fixed together with a conductive adhesive 12. The technique disclosed in Patent Reference 1 uses this arrangement to efficiently transmit heat generated by the light emission of the point light source 3 by way of a metallic frame 6 thus enhancing the heat dissipation, which allows the element density of the point light source 3 and the current supplied to each point light source 3.

In a backlight device disclosed in Patent Reference 2, a soft metallic sheet 7 for dissipating heat from a light-emitting diode 2 formed in almost the same shape as a film wiring board 4 is bonded with adhesive to a surface opposite to the surface of the film wiring board 4 on which the light-emitting diode 2 is mounted, thus covering a metallic reflector 8. The technique disclosed in Patent Reference 2 uses this arrangement to effectively transmit heat generated on the light-emitting diode 2 as a light source to the film wiring board 4 and a heat-dissipating member such as the soft metallic sheet 7 without letting the heat fill the backlight device itself.

However, the light source devices disclosed in Patent Reference 1 and Patent Reference 2 have following disadvantages. For example, although a light source substrate and a heat-dissipating member are fixed together with an adhesive, the adhesive peels off over time.

When a metallic plate such as an MCPCB (Metal Core Printed-Circuit Board) is used for a light source substrate in order to prevent the peel-off, the resulting cost is higher than that of using an FPC.

[Patent Reference 1] JP-A-2006-210183 (Pages 2-5, FIGS. 1-4)

[Patent Reference 2] JP-A-2002-229022 (Pages 3-7, FIGS. 1-4)

SUMMARY

The invention has been accomplished in order to solve the problems and is capable of efficiently dissipating heat from a light source substrate directly mounting a point light source. The invention provides a light source device capable of firmly fixing a light source substrate and a heat-dissipating part to each other. The invention further provides a surface light source device mounting the light source device having a structure whereby the light source device is readily replaced with spare without breakage or a wire break.

The invention provides a light source device comprising: a point light source for emitting light; a light source substrate directly mounting the point light source; a light source substrate cover having a through hole or a notch in a position to which the point light source corresponds, the light source substrate cover arranged opposite to a surface of the light source substrate on which the point light source is mounted; and a support member for supporting the light source substrate, the support member arranged to be opposed to the reverse side of the mounting surface of the light source substrate, the support member has a substantially same size with the light source substrate; wherein the light source substrate cover and the support member sandwich the light source substrate to support the light source substrate.

The light source device according to the invention comprises: a light source substrate directly mounting a point light source for emitting light; a light source substrate cover including a through hole or a notch in a position to which the point light source corresponds, the light source substrate cover arranged opposite to the surface of the light source substrate on which the point light source is mounted; and a support member for supporting the light source substrate, the support member arranged opposing a surface opposite to the mounting surface of the light source substrate; characterized in that the light source substrate cover and the support member sandwich the light source substrate to support the same.

This arrangement efficiently dissipates heat from a light source substrate mounting a point light source.

BRIEF DESCRIPTION OF THE DRAWINGS

Illustrative aspects of the invention will be described in detail with reference to the following figures wherein.

DETAILED DESCRIPTION OF THE PREFERRED EMBODIMENTS

Exemplary embodiments of the invention concerning the configuration of a display device according to the invention and a method for manufacturing the display device will be described referring to drawings. Same signs used across the drawings show substantially the same configuration.

Embodiment 1

Figure 1:
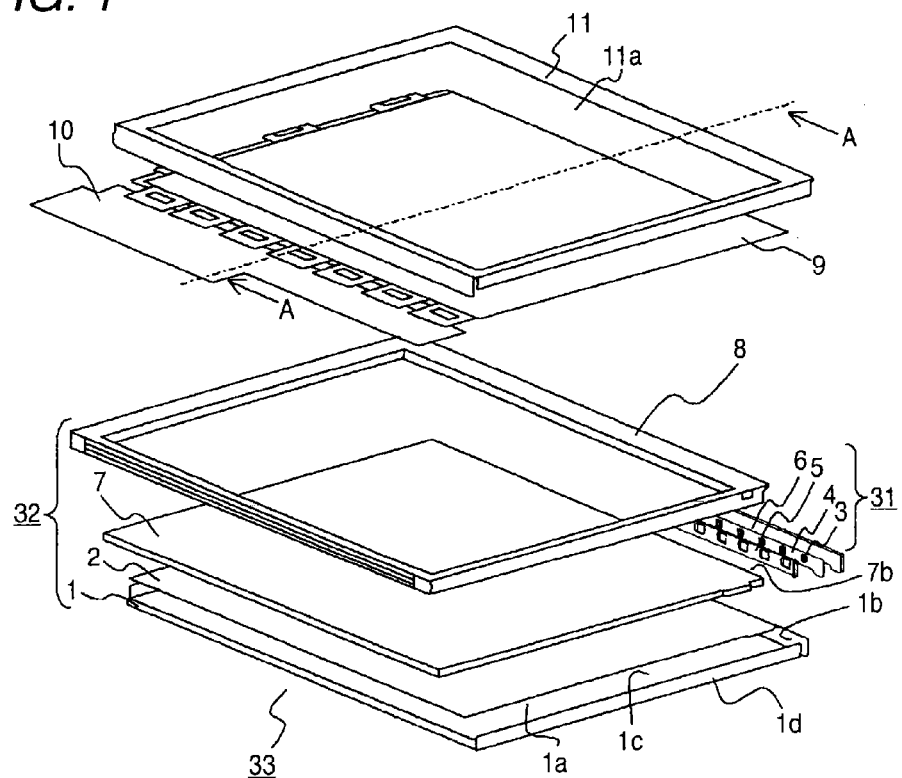
FIG. 1 is an exploded perspective view of a display device according to Embodiment 1 of the invention.
Figure 2:
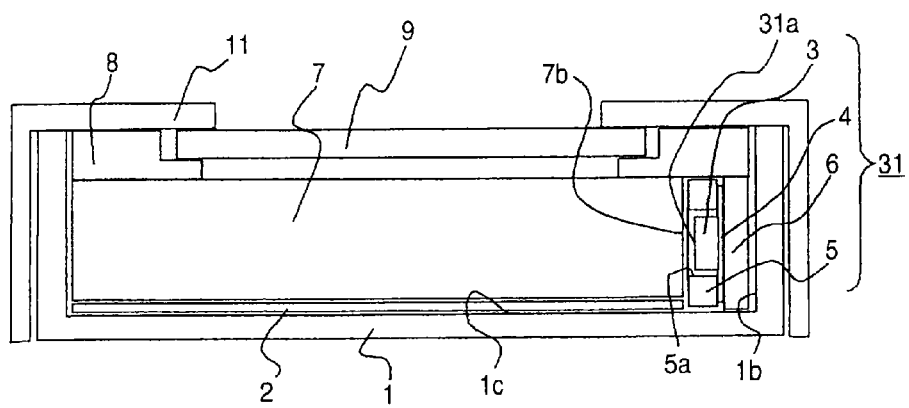
FIG. 2 is a cross-sectional view of a surface light source device assumed in case the display device in FIG. 1 is assembled, taken in the direction of arrow A-A.
Figure 3:
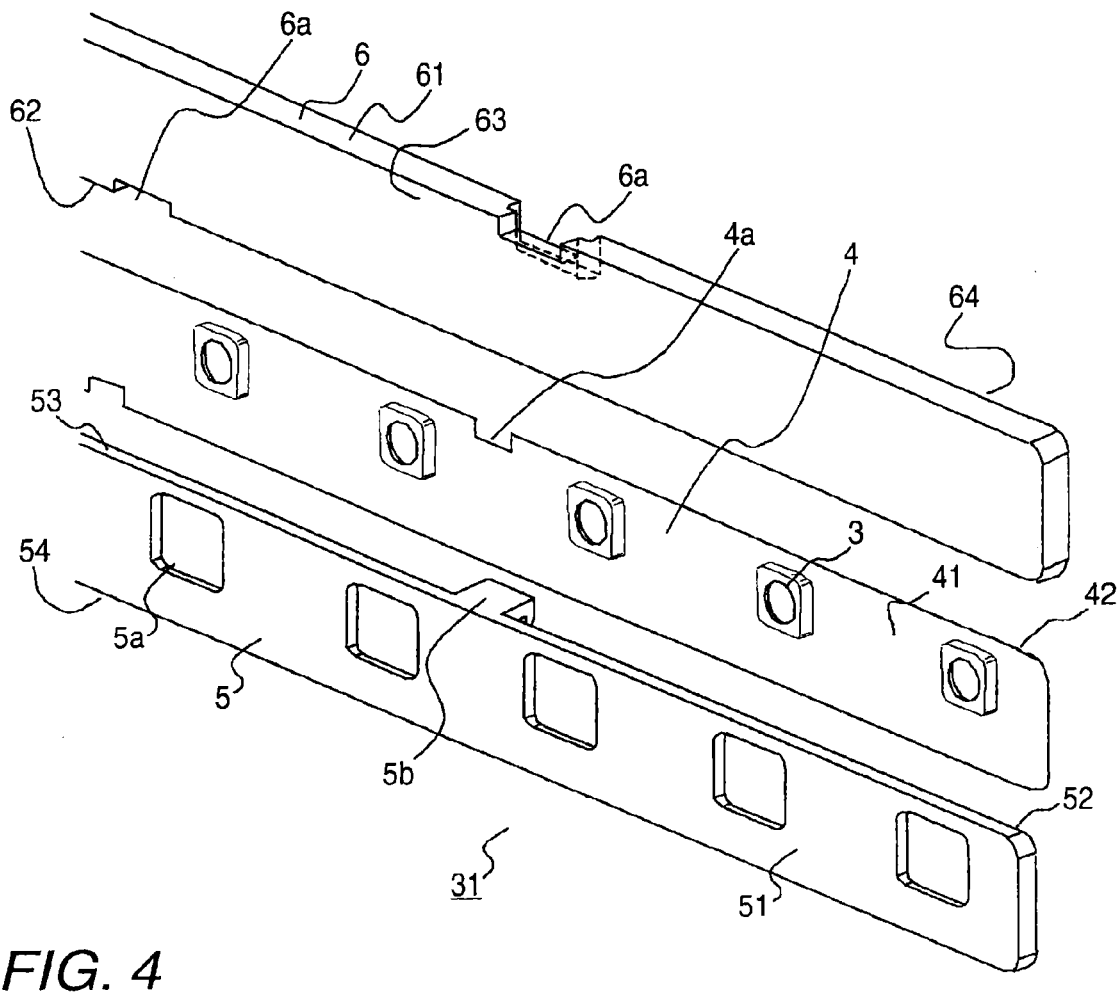
FIG. 3 is an exploded perspective view of a light source device according to Embodiment 1 of the invention.
Figure 4:
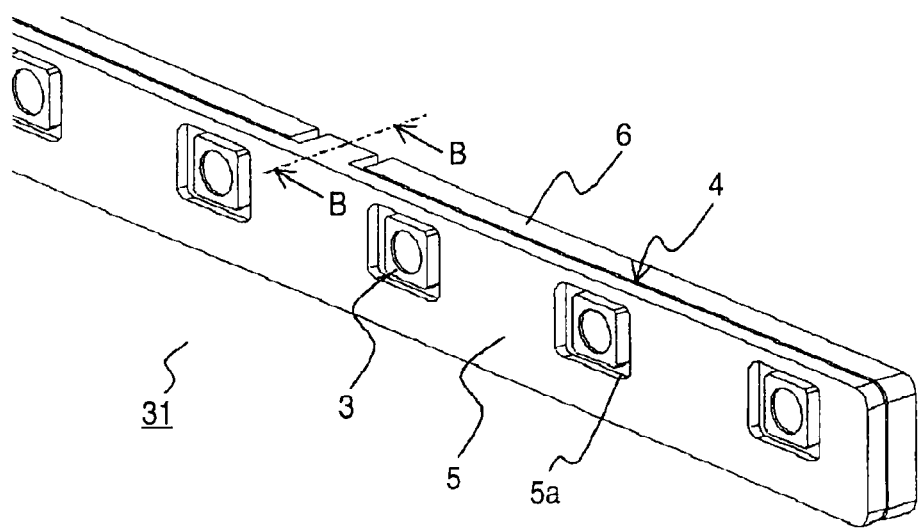
FIG. 4 is an enlarged view of main parts of the light source device according to Embodiment 1 of the invention in an assembled state.
Figure 5:
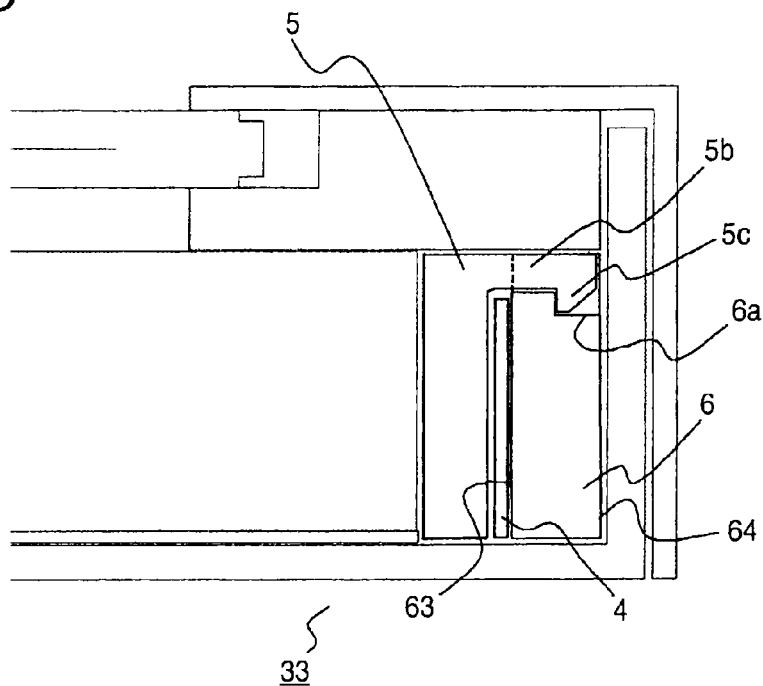
FIG. 5 is a cross-sectional view of the light source device in FIG. 4 taken in the direction of arrow B-B.

FIG. 1 is an exploded perspective view showing a general configuration of a display device according to the invention. FIG. 2 is a cross-sectional view of the display device in FIG. 1 in an assembled state taken in the direction of arrow A-A. FIG. 3 is an exploded perspective view showing a general configuration of a light source device mounted on the display device according to the invention. FIG. 4 is an enlarged view of main parts of the light source device in an assembled state. FIG. 5 is a cross-sectional view of the light source device in FIG. 4 taken in the direction of arrow B-B.

Embodiment 1

As shown in FIG. 1 or 2, a numeral 1 represents a box-shaped rear frame 1 having an opening 1a. A light source device 31 for emitting light is arranged on an inner side surface 1b as a side surface of the inner wall of the rear frame 1. A reflector 2, which guides light emitted from the light source device 31 toward the opening 1a, is arranged on the bottom surface 1c of the inner wall of the rear frame 1. An almost rectangular light guide plate 7 for propagating, in the shape of a plane, light emitted from the light source device 31 is arranged inside the rear frame 1. An incidence surface 7b as a side surface of the light guide plate 7 is arranged in a position opposite to a light-emitting part 31a of the light source device 31 from which light is emitted. The rear frame 1 is fitted to a front frame 8 including an opening to provide a surface light source device 32. A display panel 9 and a circuit board 10 for driving and controlling the display panel 9 are arranged on the exit surface of the surface light source device 32. A front frame 11 including an opening 11a is fitted to the surface light source device 32 to provide a display device 33.

Next, the light source device 31 according to Embodiment 1 will be detailed referring to drawings. As described earlier, in FIG. 1, the light source device 31 is arranged on the inner side surface 1b of the rear frame 1. As shown in FIGS. 3 and 4, the light source device 31 includes an almost rectangular light source substrate 4 on which point light sources 3 are mounted, a light source substrate cover 5 arranged on the surface 41 of the light source substrate 4 mounting the point light sources 3, and a support member 6 arranged opposite to a rear surface 42. The point light source 3 is made of, for example, a light-emitting diode for emitting light of red, green, blue, or white color or an intermediate color thereof. A single point light source or a plurality of point light sources 3 is arranged and mounted on the light source substrate 4 via soldering. In case plural point light sources 3 are mounted, a particular color of light may be selected depending on the application. A combination of colors may be selected as required. The point light sources 3 may be arranged in desired positions and with desired spacing depending on the application or purpose. In Embodiment 1, plural point light sources 3 are mounted on the light source substrate 4 in an almost straight line and with same spacing.

As shown in FIGS. 2 to 4, the light source substrate 4 of the light source device 31 includes a recessed part 4a in a position where a projection 5b provided on a light source substrate cover 5 and a recessed part 6a provided on the support member 6 overlap one on the other. The light source substrate 4 may be a glass epoxy substrate, metal base substrate, a flexible substrate or the like. A wiring pattern (not shown) for feeding power to the point light sources 3 is arranged on the light source substrate 4.

As shown in FIGS. 2 to 5, the light source substrate cover 5 is arranged on the surface 41 of the light source substrate 4 mounting the point light sources 3. Through holes 5a are formed on the light source substrate cover 5, and the through holes 5a are formed in a position where the through holes 5a is arranged opposite to the point light sources 3 on the light source substrate 4. A projection 5b protruding from a rear surface 52 is arranged between the through holes 5a, and arranged on the side of a top surface 53 and a bottom surface 54. As shown in FIG. 5, the projection 5b comprises a tip 5c fitted in a recessed part 6a provided on the support member 6. As shown in FIG. 2, by forming the light source substrate cover 5 thicker than the point light source 3 so that the point light source 3 mounted on the light source substrate 4 will not protrude from the through hole 5a, as described below, it is possible to prevent the point light source 3 from being damaged while being in contact with the rear frame 1, front frame 2, light guide plate 7 or the like upon assembling the light source device 31 into the display device 32 or in an attempt to remove the light source device 31. The through hole 5a may be a notch and may have any shape as long as the shape receives a light source. The light source substrate cover 5 is made of a plastic resin, a metal, or a material including a metallic material. The light source substrate cover 5 may be formed of a single member or a combination of plural members. The light source substrate cover 5 desirably includes a surface formed of a high reflection member in a white color or having a mirror surface so that light emitted from the point light source 3 is directed to the light guide plate 7.

As shown in FIGS. 2 to 5, the support member 6 is formed in the same size equal to or larger than that of the light source substrate 4 and arranged on the side of the rear surface 42 of the light source substrate 4 thus preventing warp or displacement of the light source substrate 4. The top surface 61 and bottom surface 62 of the support member 6 are provided with recessed parts 6a for fitting to the light source substrate cover 5. As shown in FIGS. 3 and 5, the recessed part 6a is a recessed part 6a with a different step height on the front surface 63 or on the rear surface 64, and the recessed part 6a is formed so that the projection 5b and the tip 5c of the light source substrate cover 5 will not protrude from the rear surface 64 and the top surface 61 of the support member 6. While the support member 6 may be formed of a plastic resin, the support member 6 may be formed of a metal with high thermal conductivity including aluminum, stainless steel, iron or copper, or a material including such a metal in order to enhance the heat dissipating effect. The support member 6 may be formed of a single member or a combination of plural members.

Next, a method for assembling the light source device 31 will be described referring to FIG. 3. First, the light source device 31 is arranged so that the rear surface 42 of the light source substrate 4 mounting the light sources 3 will overlap the front surface 63 of the support member 6. Next, arrangement is made so that the recessed part 4a of the light source substrate 4 will match the recessed part 6a of the support member 6. Next, the through holes 5a of the light source substrate cover 5 are arranged so as to fit over the point light sources 3. The projection 5b is aligned with the position of the support member 6 where the recessed part 6a of the support member 6 is formed and the projection 5b and the tip 5c are fitted in the recessed part 6a. In this procedure, a double-faced tape, an adhesive, or grease with high thermal conductivity may be used to fix the light source substrate 4 to the support member 6. This enhances adhesion of the light source substrate 4 to the support member 6 thus improving the heat dissipation. Even in case an adhesive is degraded over time, it is possible to firmly fix the light source substrate 4 and the support member 6 together by fitting and fixing the members to each other.

As shown in FIGS. 3 and 5, in the light source device 31, at least two fitting parts formed of the projection 5b and the tip 5c of the light source substrate cover 5, the recessed part of the light source substrate 4, and the recessed part 6a of the support member 6 are formed at each member to fix the members. By arranging the fitting parts in four positions, that is, two positions on the top surface (53, 61) and two positions on the bottom surface (54, 62), fixing of the members are made reliable.

While the projection 5a and the tip 5c for fitting are provided on the light source substrate cover 5 and the recessed part 6a for fitting is provided on the support member 6 in this embodiment, the recessed part may be provided on the light source substrate cover 5 and the projection and tip may be provided on the support member 6. In this way, the positions and numbers of fitting parts may be arbitrarily changed.

Figure 6:
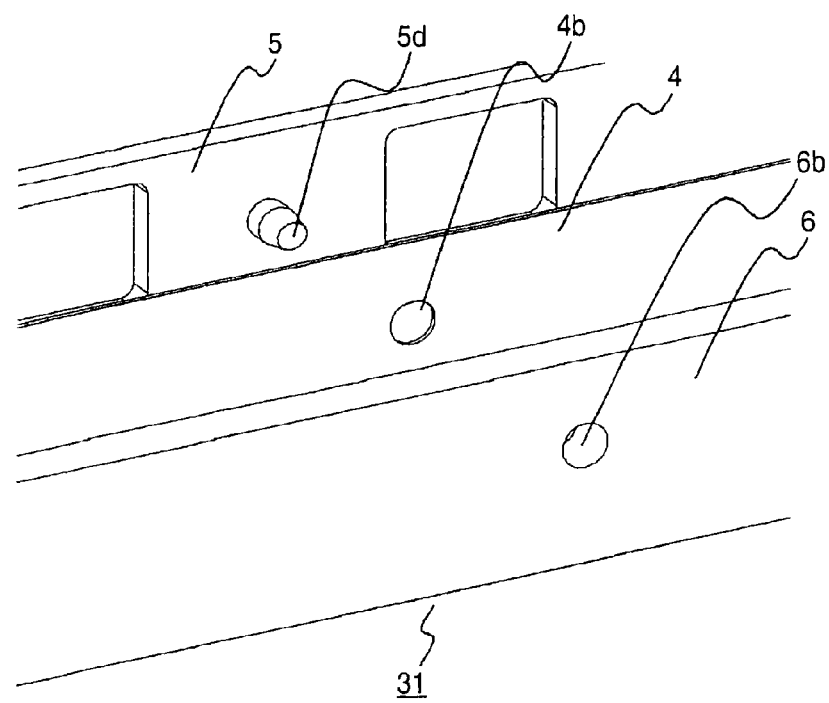
FIG. 6 is an enlarged view of main parts of the light source device according to Embodiment 1 of the invention.

As shown in FIG. 6, a projection 5d for positioning is arranged on the light source substrate cover 5 and positioning holes for the projection 5d are provided in the light source substrate 4 (4b) and the support member 6 (6b). They are separately from the above-described fitting part and positioning. By forming the projection for positioning and corresponding positioning holes and performing positioning, it is possible to prevent displacement of the light source substrate cover 5, light source substrate 4 and support member 6 that could occur in the process of assembling the light source device 31 and the process of assembling the display device 33. While a projection is provided on the light source substrate cover 5 in this example, positions and shapes of a projection for positioning and positioning holes may be changed as required. For example, a projection may be provided on the support member 6.

Figure 7:
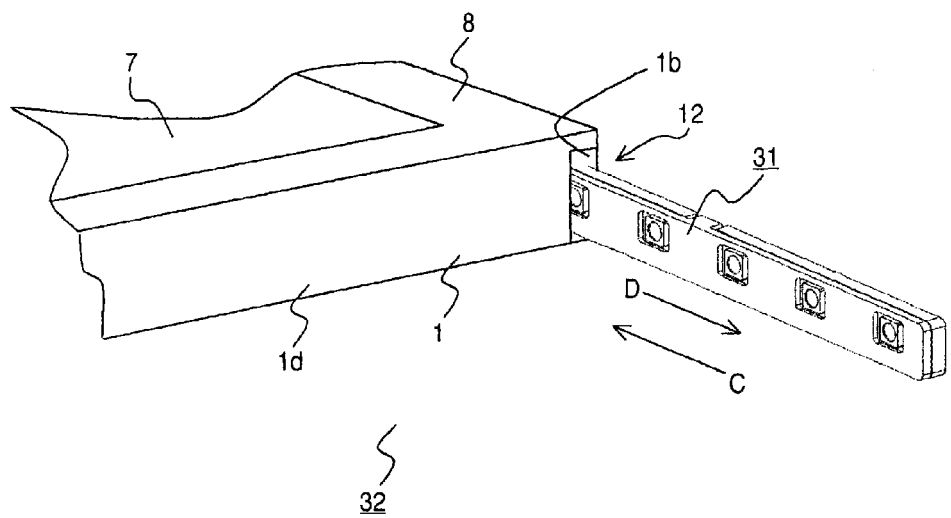
FIG. 7 is an exploded perspective view of a surface light source device according to Embodiment 1 of the invention.

Next, a method for assembling the light source device 31 of Embodiment 1 into the display device 33 will be described. FIG. 7 is an enlarged view of main parts assumed when the light source device 31 is assembled into the surface light source device 32.

As described above, in the light source device 31, the light source substrate cover 5 and the support member 6 sandwich the light source substrate 4 to support the same so as to firmly fix the light source substrate 4 and the support member 6 together. It is thus possible to move the light source device 31 along the inner side surface 1b of the rear frame 1 to assemble the light source device 31 into the surface light source 32. Before the light source device 31 is assembled along the inner side surface 1b, a through hole 12 for inserting the light source device 31 is formed in the side surface 1d of the rear frame 1 and the side surface of the front frame 8 of the surface light source device 32. The light source device 31 is inserted from the through hole 12, along the inner side surface 1b of the rear frame 1 in the direction of arrow C. In case the light source device 31 is faulty and must be replaced with spare, the light source device 31 may be readily removed by pulling it out of the through hole 12 in the direction of arrow D. In FIG. 1, if wishing to arrange the light source device 31 in a replaceable fashion in the display device 33, a through hole is formed in the front frame 11 in a position corresponding to the through hole 12.

As described above, the light source device 31 according to the invention includes a light source substrate 4 mounting the light sources 3. The light source substrate cover 5 is arranged on the surface 41 of the light source substrate 4 mounting the point light sources 3. The support member 6 is arranged on the rear surface 42. The light source substrate cover 5 and the support member 6 sandwich the light source substrate 4 to support the same, which prevents deformation of or slack in the light source substrate 4 and efficiently transmits heat from the point light sources 3 to the support member 6. The projection 5b and the tip 5c of the light source substrate cover 5 are matched with the position of the support member 6 where the recessed part 6a is formed. The projection 5b and the tip 5c are fitted in the recessed part 6a and the members are fixed together, thus firmly fixing the light source substrate 4 to the support member 6. Further, the light source device 31 may be inserted/removed into/from the through hole 12 provided in the surface light source device 32. It is thus possible to readily replace the light source device 31 with spare in case the light source device 31 has gone faulty.

Figure 8:
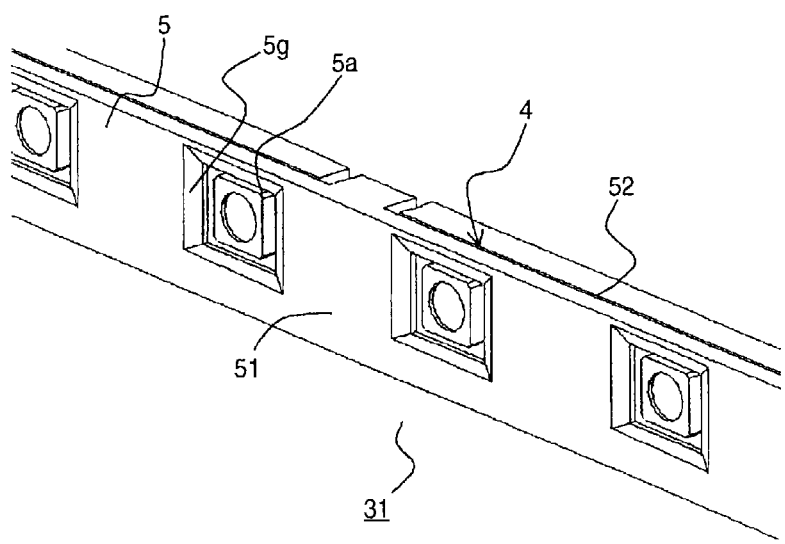
FIG. 8 is an enlarged view of main parts of the light source device according to Embodiment 1 of the invention.

As shown in the enlarged view of main parts of FIG. 8, as a variation of the light source device 31 of this embodiment, a tapered part 5g is provided at the through hole 5a of the light source substrate cover 5 for receiving the point light source 3. The tapered part 5g is arranged on the inner side surface forming the through hole 5a provided in the light source substrate cover 5, so as to slant the through hole 5a and enlarge the same from the rear surface 52 as a surface opposite to the mounting surface 41 of the light source substrate 4 toward the front surface 51 as a surface opposite to the rear surface 52. When the light source device 31 including the tapered part 5g is assembled into the display device 33 shown in FIG. 1, light emitted from the point light source 3 may be reflected on the tapered part 5g to be directed to the light guide plate 7. This eliminates reflection losses at the light source substrate cover 5 and efficiently causes light emitted from the point light source 3 to be incident on the light guide plate 7.

Figure 9:
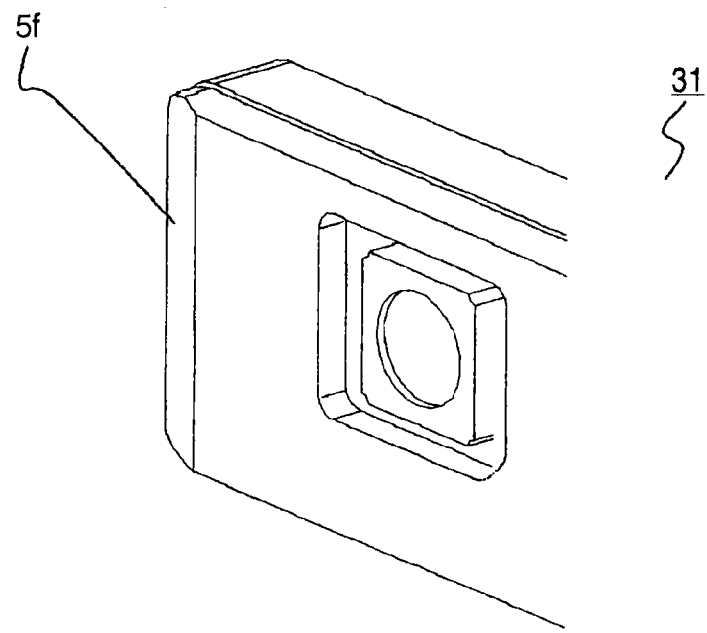
FIG. 9 is an enlarged view of main parts of the light source device according to Embodiment 1 of the invention.
Figure 10:
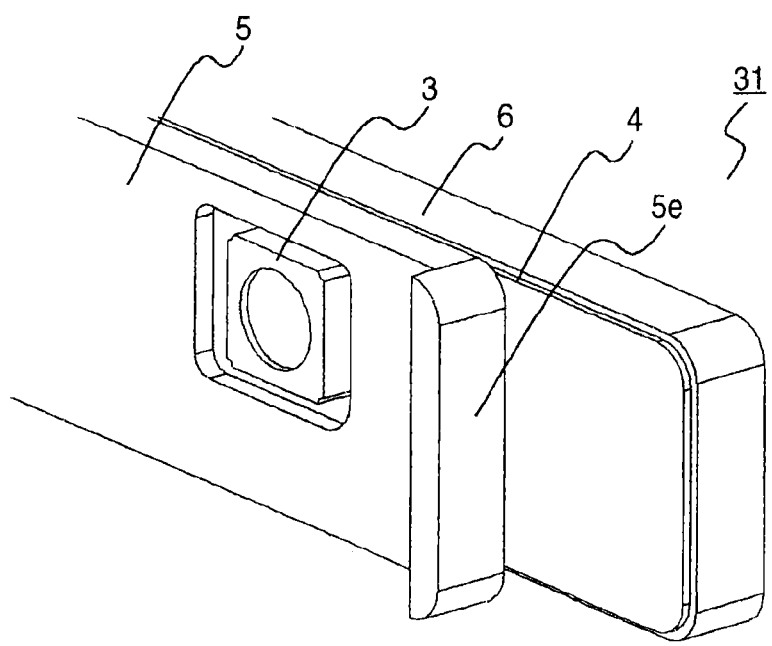
FIG. 10 is an enlarged view of main parts of the light source device according to Embodiment 1 of the invention.

As shown in the enlarged view of main parts of FIG. 9, as another variation of the light source device 31 of this embodiment, a chamfered part 5f is formed at an end of the light source substrate cover 5. The chamfered part 5f is formed at the insertion-starting end of the light source substrate cover 5 before the light source device 31 is inserted from the through hole 12 so as to enhance the workability. Further, as shown in FIG. 10, a projecting part 5e is arranged at an end of the light source substrate cover 5 where insertion of the light source device 31 is finished. By arranging the projecting part 5e, it is possible to prevent leakage of light from the through hole 12 as well as cause light destined to the projecting part 5e to reflect toward the light guide plate 7.

While the light source device 31 is arranged on one side of the inner side surface 1b of the rear frame 1 in this embodiment, the light source devices 31 may be arranged on two to four sides to enhance and make uniform the luminance.

The rear frame 1 is made of a metal with high thermal conductivity including aluminum, stainless steel, iron or copper, or a plastic resin. The rear frame 1 may be composed as a single member or a combination of plural members as required.

The front frame 8 is made of a metal with high thermal conductivity including aluminum, stainless steel, iron or copper, or a plastic resin. The front frame 8 may be composed as a single member or a combination of plural members as required.

A display panel 9 may be a liquid crystal panel. A liquid crystal panel is composed of a pair of reflectors sandwiching in a bonding fashion a pair of glass substrates (top and bottom) which are sealed with a sealant and between which a liquid crystal is injected. The display panel 9 is coupled to a circuit board 10, such as a flexible substrate on which a driving IC chip is mounted, for driving and controlling the display panel 9.

An optical sheet such as a diffusion sheet, a prism sheet or a polarization reflection sheet, or a plate-shaped light diffusion member is arranged between the display panel 9 and the light guide plate 7 in order to enhance the display performance.

The material of the light guide plate 7 is generally a highly transparent material such as PMMA (Polymethylmethacrylate) or PC (Polycarbonate). It is favorable to provide a certain amount of distance between the point light source 3 and the light guide plate 7 in order to prevent degradation of the light guide plate 7 attributable to heat from the point light source 3 in use under high temperatures. As in Embodiment 1, it is possible to provide a certain amount of distance between the point light source 3 and the light guide plate 7 by providing the light source substrate cover 5 with a thickness greater than that of the point light source 3.

Embodiment 2

Figure 11:
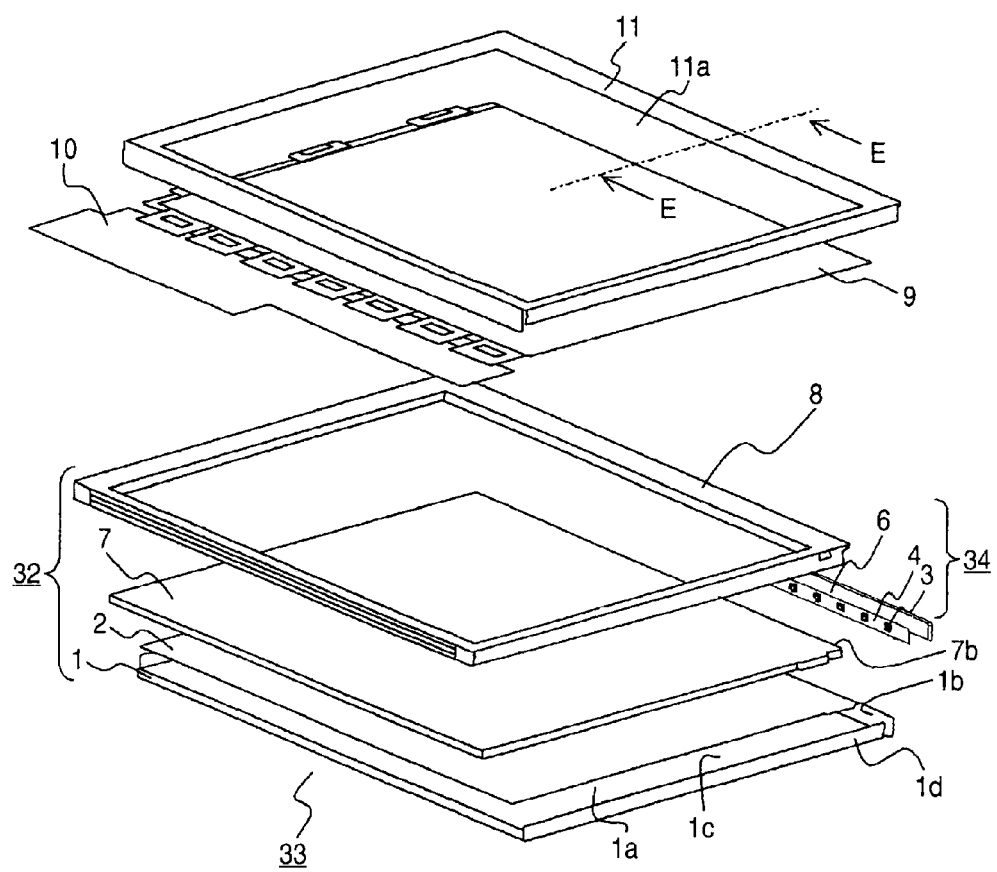
FIG. 11 is an exploded perspective view of a display device according to Embodiment 2 of the invention.
Figure 12:
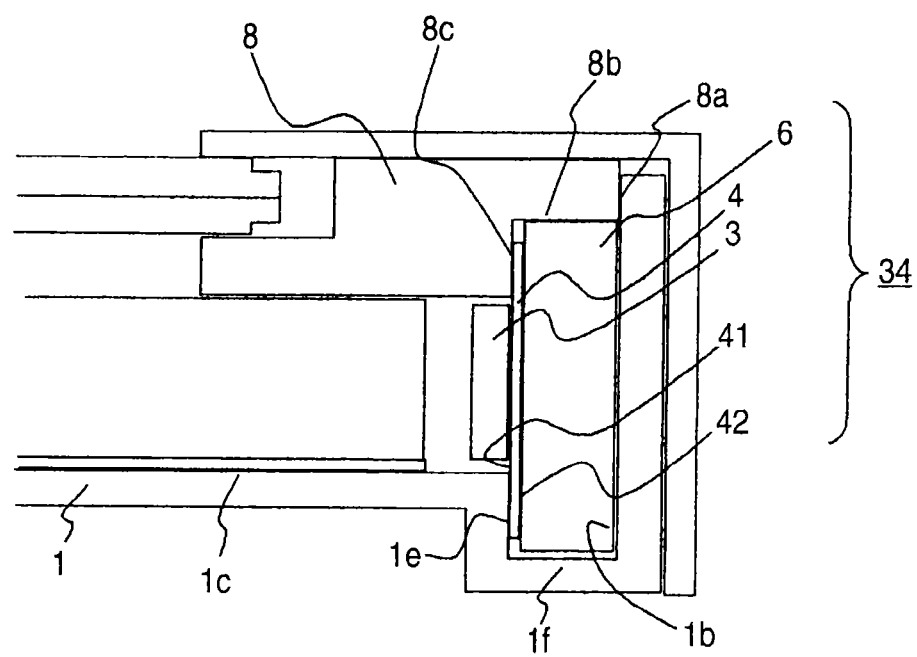
FIG. 12 is a cross-sectional view of the display device in FIG. 11 in an assembled state taken in the direction of arrow E-E.

FIG. 11 is an exploded perspective view of a display device showing according to Embodiment 2 of the invention. FIG. 12 is a cross-sectional view of the display device in FIG. 11 in an assembled state taken in the direction of arrow E-E. As shown in FIGS. 11 and 12, a light source device 34 in Embodiment 2 includes a support member 6 arranged on the rear surface 42 of the light source substrate 4 but does not include a light source substrate cover 5 such as one in Embodiment 1 arranged on the surface 41 of the light source substrate 4 mounting point light sources 3. The light source device 34 is fitted to a projection 1f formed on the rear frame 1 and a recessed part 8b formed of the rear frame 1 and a front frame 8 to support the light source substrate 4 and the support member 6. Embodiment 2 is different from Embodiment 1 only in that the light source device 34 is fitted to the projection 1f formed on the rear frame 1 and the recessed part 8b formed of the rear frame 1 and the front frame 8 to support the light source substrate 4 and the support member 6. The remaining configuration is the same as that of Embodiment 1.

In FIGS. 11 and 12, a projection 1f is formed on part of a bottom surface 1c opposite to the opening 1a of the rear frame 1, and the projection 1f includes one side of the bottom surface 1c and forms convex from inside to outside. By fitting the light source device 34 to the inner wall of the projection 1f, the light source substrate 4 and the support member 6 are supported. In the process, the support member 6 is arranged opposite to the inner side surface 1b of the rear frame 1. The mounting surface 41 of the light source substrate 4 is arranged opposite to a support part 1e forming part of the projection 1f.

A recessed part 8b is formed of an inner side surface 1b of the rear frame 1 and part of the side surface 8a of the front frame 8 having a side surface 8a arranged in opposite position and fitted to the inner side surface 1b of the rear frame 1. The light source device 34 is fitted in the recessed part 8b. The mounting surface 41 of the light source substrate 4 is arranged opposite to the support part 8c formed at the recessed part 8b and fits, together with the inner side surface 1b of the rear frame 1, the light source substrate 4 and the support member 6 and supports them.

The method for assembling the light source device 34 into the surface light source device 32 according to Embodiment 2 fits the light source device 34 to the inner wall of the projection 1f formed on part of the bottom surface 1c of the rear frame 1. In the process, the support member 6 is arranged opposite to the inner side surface 1b of the rear frame 1. The mounting surface 41 of the light source substrate 4 is arranged opposite to a support part 1e forming part of the projection. Next, a reflector 2 and a light guide plate 7 are arranged. The front frame 8 is fitted to the rear frame 1 and the light source device 34 is fitted in the recessed part 8b.

As described above, the surface light source device 32 according to Embodiment 2 forms, on part of a bottom surface 1c opposite to the opening 1a of the rear frame 1, a projection 1f including one side of the bottom surface 1c and becoming convex from inside to outside and fits the light source device 34 in the recessed part 8b to the inner wall of the projection 1f and in the recessed part 8b formed of the rear frame 1 and the front frame 8. This firmly fixes the light source substrate 4 and the support member 6.

The projection 1f formed on the bottom surface 1c of the rear frame 1 may be arranged along the light source substrate 4 or support part of the light source substrate 4. In Embodiment 2, while the light source device 34 is supported by fitting the light source device 34 to the projection 1f formed on the rear frame 1 or in the recessed part 8b formed of the rear frame 1 and the front frame 8, any shape may be used as long as the shape allows fitting of the light source device to the rear frame 1 and the front frame 8. The position where the recessed part 8b is formed may be changed in various ways.

The support member 6 may be fixed to the rear frame 1 via a screw or an adhesive so as to dissipate heat from the light source substrate 4 via the support member 6.

What is claimed is:

1. A surface light source device comprising:
a rear frame;
a support member fixed to the rear frame;
a light source substrate including a mounting surface, on which a point light source is mounted, and a rear surface fixed to the support member; and
a front frame including a recessed part arranged opposite to a part of the mounting surface, and a side part formed in a succession of the mounting surface,
wherein the rear frame and the front frame support the light source substrate and the support member.

2. The surface light source device according to claim 1, wherein the support member is fixed to the rear frame by using at least one of a screw and an adhesive to dissipate heat from the light source substrate via the support member.

3. The surface light source device according to claim 1, wherein the support member includes at least one of a projection for positioning and a positioning hole for positioning.

4. The surface light source device according to claim 1, wherein
a projection is formed on part of the bottom surface of the rear frame, which forms convex from inside to outside, and
the support member is fitted between the inner side of the projection of the front frame and the recessed part of the rear frame.

5. A display device comprising:
a surface light source device; and
a display panel arranged at an emitting side of the surface light source device,
the surface light source device further including
a rear frame,
a support member fixed to the rear frame,
a light source substrate including a mounting surface, on which a point light source is mounted, and a rear surface fixed to the support member, and
a front frame including a recessed part arranged opposite to a part of the mounting surface and a side part formed in a succession of the mounting surface,
wherein the rear frame and the front frame support the light source substrate and the support member.

* * * * *